(12) United States Patent
Rioux et al.

(10) Patent No.: US 6,179,541 B1
(45) Date of Patent: Jan. 30, 2001

(54) TRANSFER DEVICE FOR LUMBER PACKS AND OTHER LOADS

(76) Inventors: Sylvain Rioux, 18, rue du Parc, Sainte-Julie, P.Q. (CA), J0L 2S0; Thierry Benayoun, 285, rue Strasbourg, Dollard-des-Ormeaux. P.Q. (CA), H9G 1R9

( * ) Notice: Under 35 U.S.C. 154(b), the term of this patent shall be extended for 0 days.

(21) Appl. No.: 09/425,884

(22) Filed: Oct. 25, 1999

(51) Int. Cl.[7] .................................................. B65G 1/04
(52) U.S. Cl. ........................ 414/282; 414/607; 414/281; 414/278; 414/663; 414/401; 187/222; 198/861.1
(58) Field of Search .............................. 254/2 R; 414/281, 414/282, 278, 607, 662, 663, 277, 667, 671, 401, 396, 584; 187/222; 198/861.1

(56) References Cited

U.S. PATENT DOCUMENTS

| | | | |
|---|---|---|---|
| 2,538,747 | * 1/1951 | Drew | 414/607 X |
| 3,292,804 | * 12/1966 | Veneman | 414/607 X |
| 3,854,616 | * 12/1974 | Willis et al. | 414/607 |
| 4,109,805 | 8/1978 | Wagner . | |
| 4,541,766 | * 9/1985 | Dahl | 414/277 |
| 4,993,905 | 2/1991 | Potocnjak . | |
| 5,033,928 | 7/1991 | Suominen . | |
| 5,429,469 | 7/1995 | Zimek . | |
| 5,487,635 | 1/1996 | Hellkuhl et al. . | |
| 5,630,692 | 5/1997 | Hanaya . | |
| 5,688,098 | 11/1997 | Theno . | |

* cited by examiner

*Primary Examiner*—Frank E. Werner
(74) *Attorney, Agent, or Firm*—Holland & Knight LLP

(57) ABSTRACT

This transfer device is to be supported by the tines of a forklift and supports a load such as a lumber pack to be transferred to a rack cell which have an anchor bar at its opening. The device comprises an underframe having tine receivers, and a mainframe which is movable with respect to the underframe towards the cell opening and which has hooks to hook onto said anchor bar. Said mainframe has rollers on which the load is supported. The system is motorized; first, the load remains centered with respect to the underframe when the mainframe is first shifted laterally of the forklift to hook onto the anchor upper bar of a selected rack cell because the frame rollers rotate in a direction opposite to the shifting direction; then the mainframe rollers rotate in the opposite direction to transfer the load into the rack cell.

13 Claims, 8 Drawing Sheets

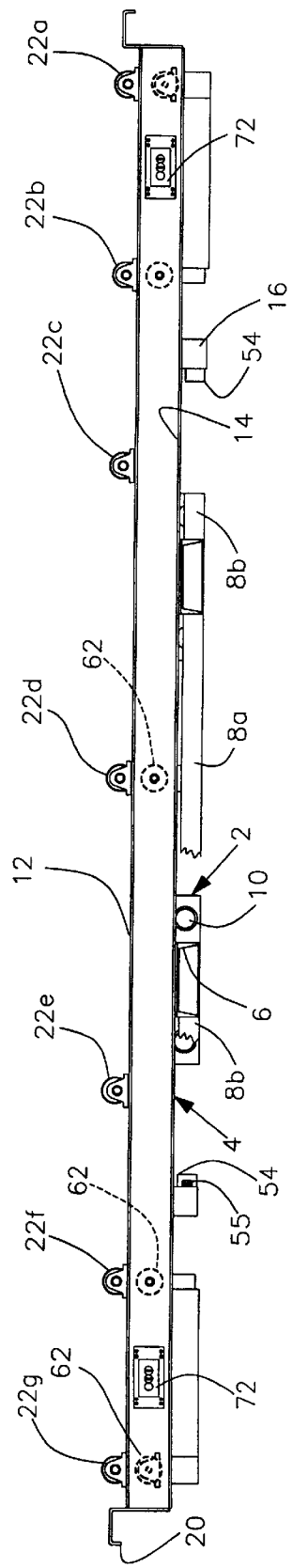
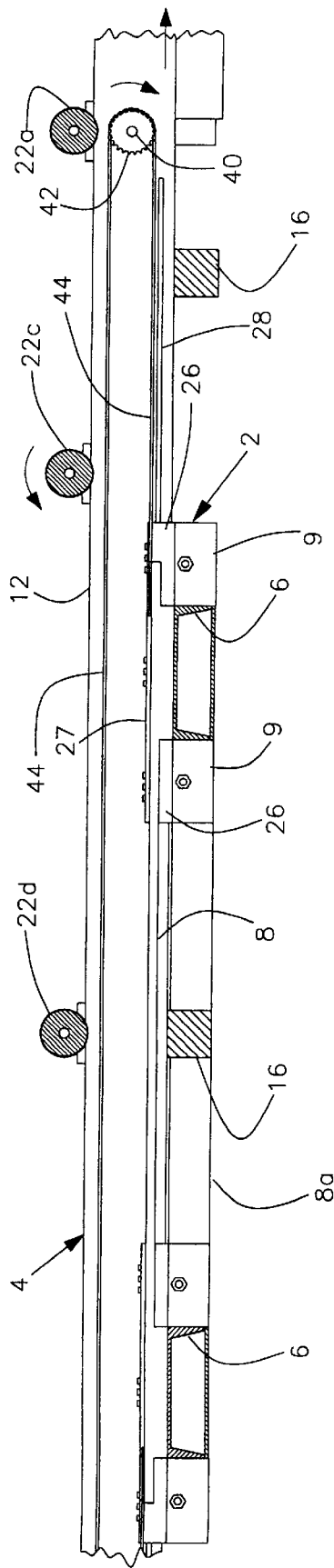
FIG.5
FIG.6

TRANSFER DEVICE FOR LUMBER PACKS AND OTHER LOADS

FIELD OF THE INVENTION

The present invention relates to a transfer device transferring a load from a forklift to any selected cell of a multiple cell rack. The load may be a pack of elongated articles such as lumber.

BACKGROUND OF THE INVENTION

U.S. Pat. No. 4,541,766 dated Sep. 17, 1985, inventor Dahl, entitled "Device for Handling Packs of Elongated Articles, Especially Lumber Packs" describes a transfer device for transferring loads such as lumber packs into cells of multiple cell racks; the cells being provided with an anchor bar at their cell openings. The device of this patent consists of a jig or elongated frame which tine receivers fixed underneath the same to be supported by a forklift transversely of the same. Long arms are telescopically carried by the frame and have hooks at their ends to engage the anchor bars. The patent states that the transverse rollers supporting the load can be motorized to transfer the load from the jig to the rack cell.

It is obvious that the forklift must travel along the rack with the jig and load at a certain distance from the rack in order to prevent accidental collision of the load with the rack. It is therefore necessary that the telescopic arms can be extended a certain distance to hook onto the anchor bar at the rack opening. The arms must be extended and retracted by hand; this is an awkward and often dangerous operation especially when an operator must stand on a high platform to load the top cells of a rack several stories high.

Also since the arms are extended during the transfer of the load from the forklift to the rack, even if the main frame rollers are motorized, it is clear that the transfer roller closest to the rack cannot push the load entirely within the rack and therefore the load will protrude a certain extent at the front of the rack if the load is not manually further pushed into the rack and the protruding load will obstruct the transfer of additional loads into the rack.

OBJECTS OF THE INVENTION

It is therefore general object of the present invention to provide a transfer device of the character described which obviates the above noted drawbacks in that the load can be fully transferred of from the forklift into a selected rack cell and entirely by motorized means, by simple operation of electric switches by an operator standing at the level of the rack cell to be loaded.

Another object of the present invention is to provide a transfer device of the character described which is safe to operate since the load remains centered with respect to the forklift carrying the same during lateral shifting and hooking of the mainframe directly to the anchor bar of the cell opening into which the load is to be transferred.

Another object of the present invention is to provide a transfer device of the character described which is of simple and inexpensive construction and which can be fitted to all types of forklifts especially elevator forklifts.

SUMMARY OF THE INVENTION

The present invention is directed to a transfer device for transferring a load to a cell of a rack which has a transverse anchor bar at its cell opening, said device comprising an underframe including forklift tine receivers, an elongated mainframe overlying said underframe and transverse to said tine receivers, said mainframe having opposite ends, transverse mainframe rollers carried by said mainframe for supporting a load on said mainframe, hooks secured to at least one end of said mainframe to hook said mainframe to said anchor bar, said mainframe overlying and supported by said underframe for guided shifting movement transversely of said tine receivers from a centered position to an off-centered position relative to said tine receivers and a motorized transmission to shift said mainframe from said centered position to said off-centered position while rotating said mainframe rollers in a first direction to maintain said load in a centered position relative to said tine receivers so as to enable hooking of said mainframe to said anchor bar and then to rotate said mainframe rollers in an opposite direction to transfer said load from said mainframe into said rack cell.

Preferably, said hooks are secured to both ends of said mainframe, said mainframe, when in centered position equally protrudes from opposite ends of said underframe and is guided for shifting movement by said transmission to a selected one of two opposite off centered positions relative to said tine receivers.

Preferably, the device further includes abutments secured to said mainframe and abutting against said underframe to limit the extent of said shifting movement.

Preferably, there are mainframe supporting idle rollers carried by said underframe and on which said mainframe is supported and guided.

Preferably, the transmission includes a first reversible motor, a first chain and sprocket gear system carried by said mainframe and driven by said first motor, the chain of said first system being attached to said underframe, and a second chain and sprocket gear system both carried by said mainframe, said second system driven by said second motor and driving said mainframe rollers and, wherein said first and second reversible motors when operating simultaneously always cause said mainframe rollers to rotate in a direction opposite to the direction of rotation of said idle rollers and at peripheral speed equal to the speed of the shifting movement of said mainframe.

Preferably, the device further includes proximity switches secured to said mainframe and electrically connected to said first motor, said proximity switches being provided to stop said shifting movement of said mainframe on either side of said underframe just prior to said abutments coming into actual contact with said underframe.

Preferably said motors are electric motors and further including batteries carried by said mainframe and electrically connected to said first and second motors.

Preferably said tine receivers are sleeve members forming part of said underframe.

BRIEF DESCRIPTION OF THE DRAWINGS

In the annexed drawings, like reference characters indicate like elements throughout.

FIG. 5 is a partially broken side elevation of the transfer device;

FIG. 6 is a longitudinal section taken a long line 6—6 of FIG. 4

DETAILED DESCRIPTION OF THE PREFERRED EMBODIMENT

Figure 1:
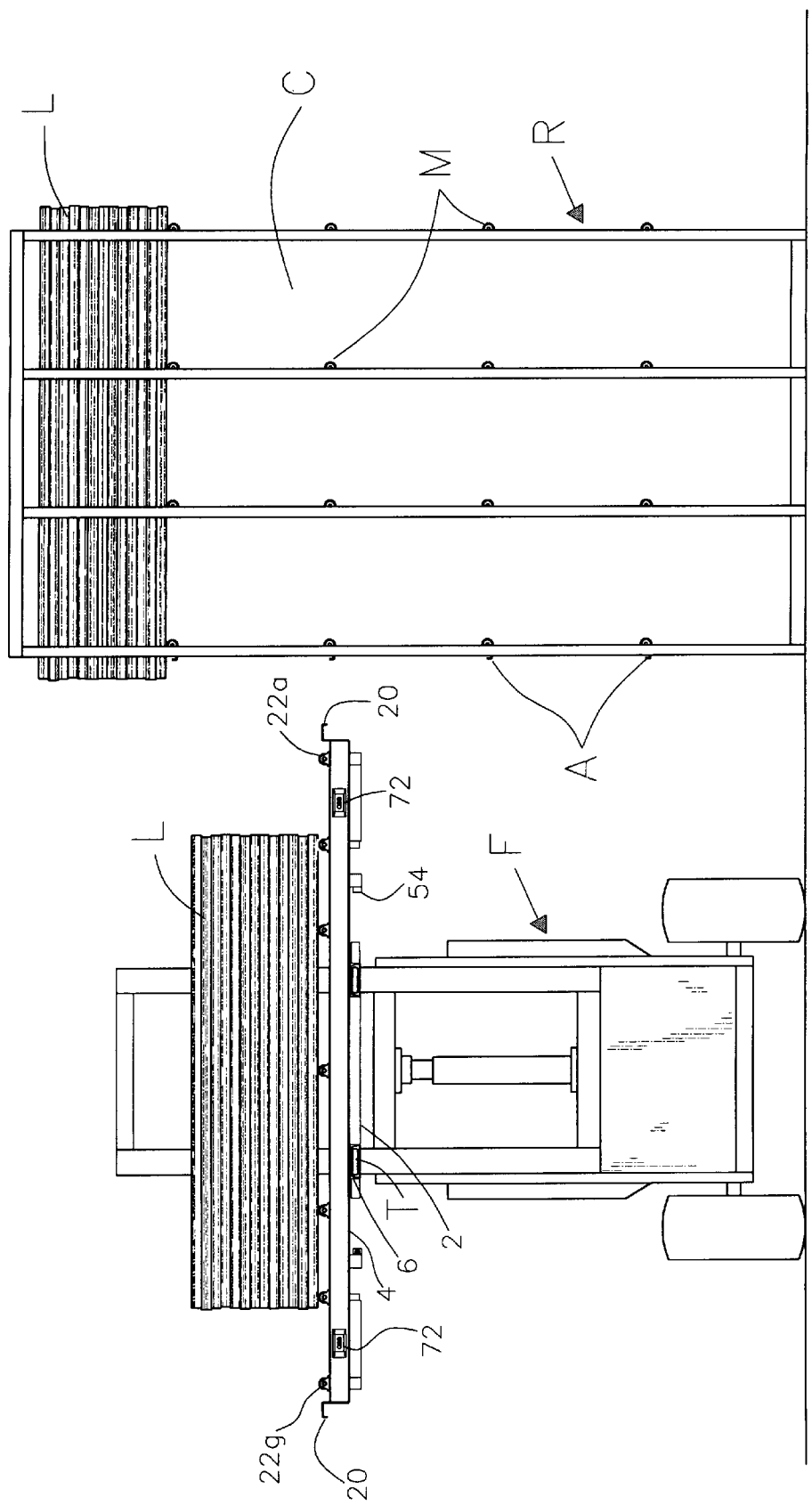
FIG. 1 is a diagrammatic view of a rack warehouse in which an embodiment of the transfer device of the invention finds application, the load being centered with respect to the forklift carrying the same.

The transfer device of the present invention comprises an underframe 2 supporting a mainframe 4 for longitudinal guided movement on the underframe 2. The latter comprises a pair of spaced tine receivers 6 in the form of rectangular tubes or ducts joined together by longitudinal frame bars 8 and 8a (see FIGS. 4, 7 and 12). Idle rollers 10 are carried on the outside of support bars 9 secured at each end of tine receivers 6. Bars 8a are secured to the extremities of tine receivers 6 so as reinforce the underframe 2 and to protect idle rollers 10 located inbetween both tine receivers 6. Small extensions 8b of bars 8a are also secured to tine receivers 6 for protection of the remaining idle rollers 10 located outward of the tine receivers 6, as seen in FIGS. 5, 6, 7, 8 and 12.

Figure 8:
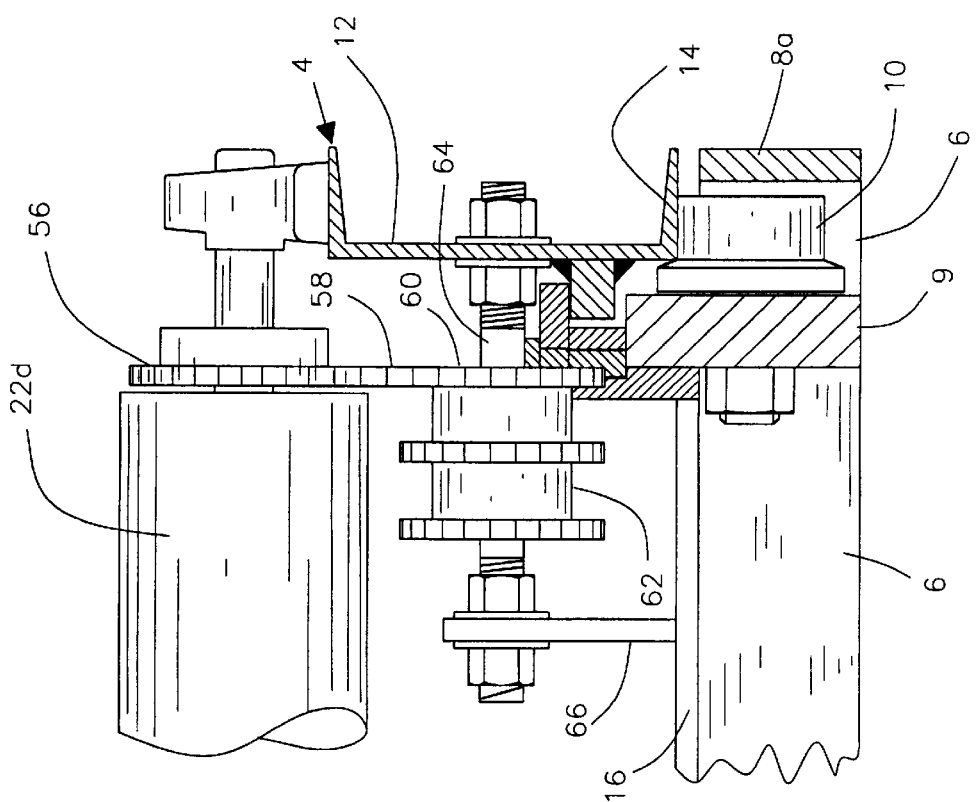
FIGS. 7 and 8 are cross-sections taken along line 7—7 and 8—8 of FIG. 4 respectively.
Figure 7:
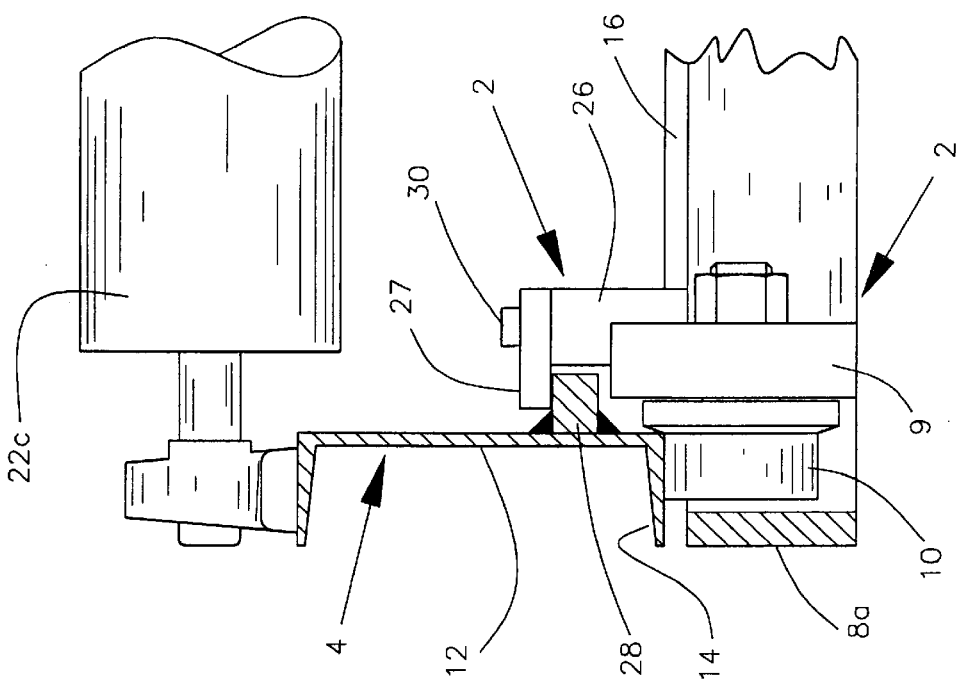
Figure 9:
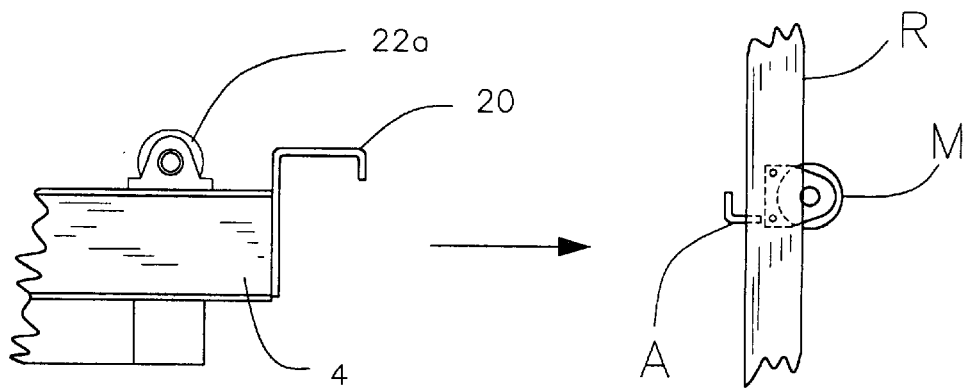
FIGS. 9, 10 and 11 are partial elevations of the end of the mainframe showing the sequential steps for hooking the mainframe to the anchor bar of the rack.
Figure 10:
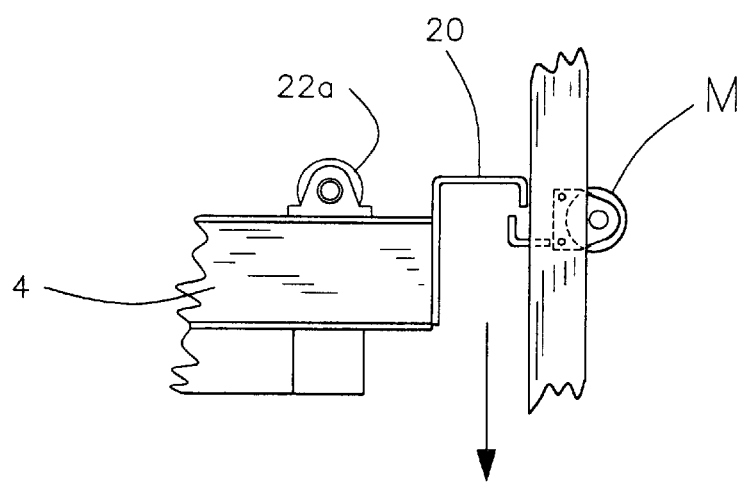
Figure 11:
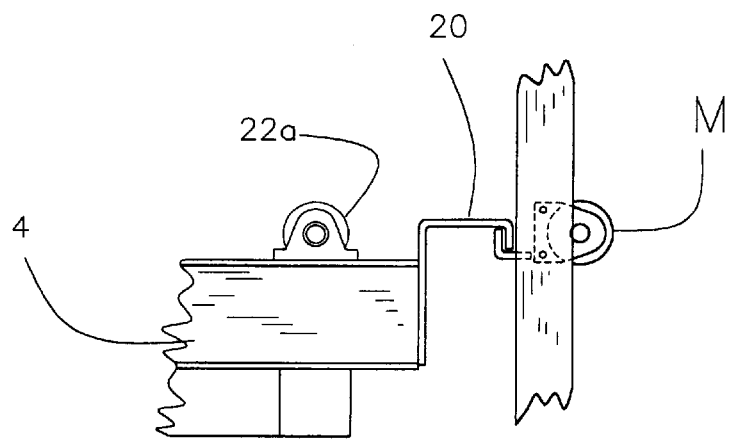

Mainframe 4 is of elongated rectangular shape and includes longitudinal side beams 12 and a smaller central beam 13 (see FIG. 4), the lower flange 14 of each of side beam 12 rides on idle rollers 10 (see FIGS. 7 and 8). Longitudinal beams 12 are interconnected by transverse bars 16, one of which is located just in between the two tine receivers 6 and by end transverse bars 18 at both ends of the longitudinal beams 12. Load supporting transverse rollers 22a–22g are supported by pillow blocks 24 secured on top of beams 12. A vertical strip 26 is secured to tine receivers 6 and a horizontal strip 27 is bolted by bolts 30 on top of strip 26 to enclose a retaining bar 28 secured to beam 12. Elements 26 to 30 form an enclosure around retaining bar 28 in order to prevent mainframe 4 to be tilted off from underframe 2, by accident, in case of unusual displacement of load L with respect to underframe 2.

A pair of hooks 20 are secured to each end transverse bars 18 at each end of the mainframe 4. These hooks 20 are designed to directly engage and hook onto the conventional transverse anchor bar A at each cell opening of a conventional warehouse rack R adapted to receive in each of its cells C a load L which may consist of an elongated stack of elongated articles such as a lumber pack.

Normally such warehouse racks R are provided at each cell opening with cell rollers indicated at M. The transfer device is supported by a forklift F with its tines T inserted into the receivers 6. Therefore the transfer device extends transversely of the forklift F.

Figure 12:
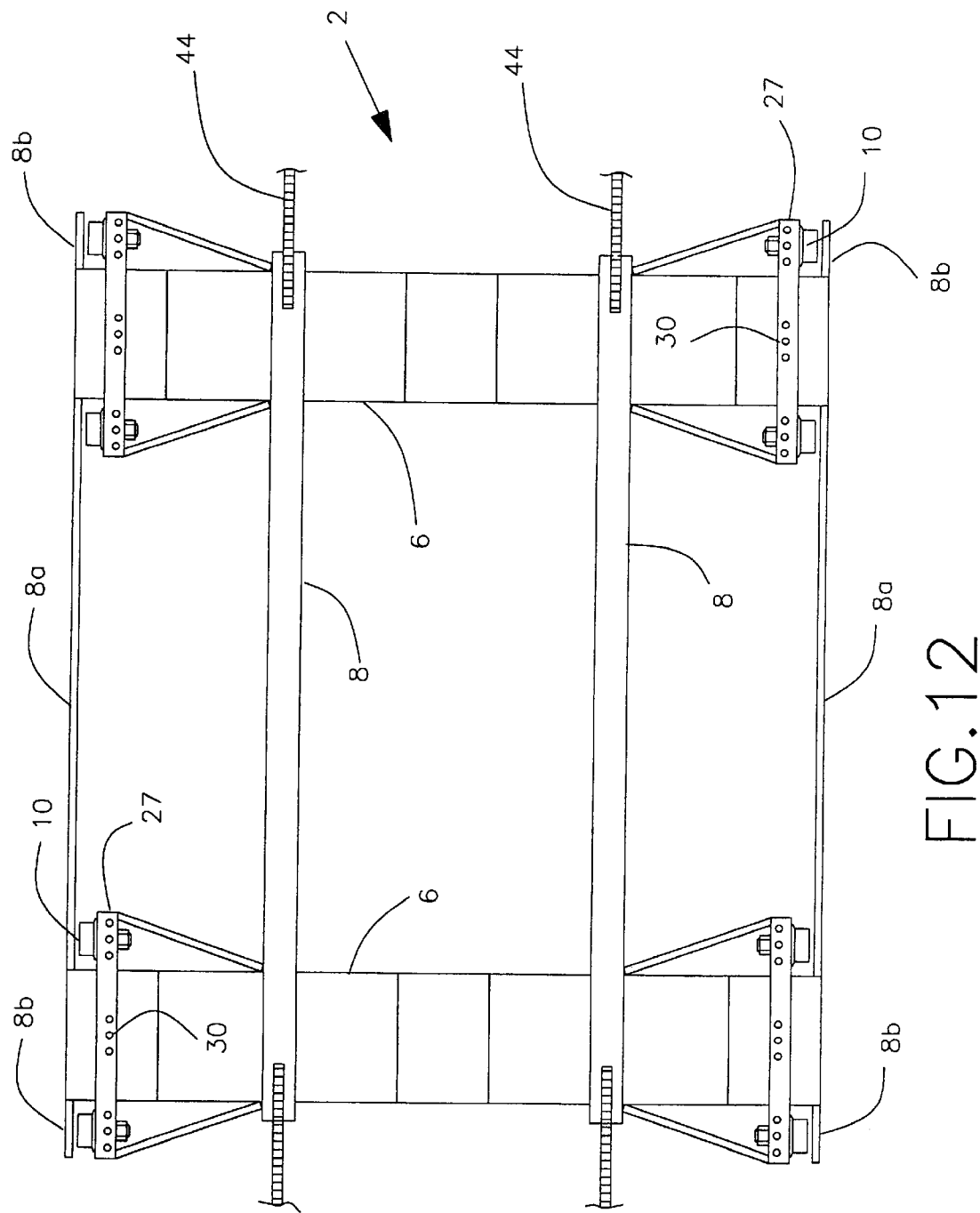
FIG. 12 is an enlarged top plan view of the underframe of FIG. 4.

The shifting movement of mainframe 4 on the underframe 2 together with the rotation movement of at least some of mainframe rollers 22a–22g are motorized. For that purpose, a motorized transmission system is provided. This system includes two reversible electric motors 32, 34 supplied by batteries 36, all mounted in the mainframe 4. Centrally mounted electric motor 32 drives through a gear and sprocket system 38 the shifting movement of the mainframe 4 on the underframe 2. The system 38 includes a counter shaft 40 (see FIG. 4), with sprockets 42 which drive two longitudally extending sprocket chains 44 which are trained supported at their outer end on end sprockets 46 mounted on a shaft 48 rotating in pillow blocks 50. As shown in FIGS. 5 and 12, the lower run of each sprocket chain 44 is secured to the extremities of longitudinal member 8 of underframe 2.

Thus rotation of motor 32 in one direction or the other will cause a shifting movement of mainframe 4 away from one or the other end of underframe 2 from a centered position over said underframe 2. This shifting movement is substantially of an equal distance on each side of the underframe 2 and limited by abutments 54 protruding from the underside of the mainframe 4 and adapted to abut against the respective ends of underframe 2 as shown in FIG. 5. Preferably, a proximity switch 55 or sensor, located inside abutments 54 or just beside them and electrically connected to said centrally mounted motor 32, is provided to stop the shifting movement of the mainframe on either side of underframe 2 just prior to the abutments 54 coming into actual contact with the underframe 2. This proximity switches 55 are then mainly used to prevent possible damages to the motor 32 that would occur after multiple contacts of the underframe 2 with abutments 54.

There are two sprocket chains 44 equally spaced from the longitudinal beams 12 to properly a balance the shifting forces exerted on the mainframe 4.

Figure 4:
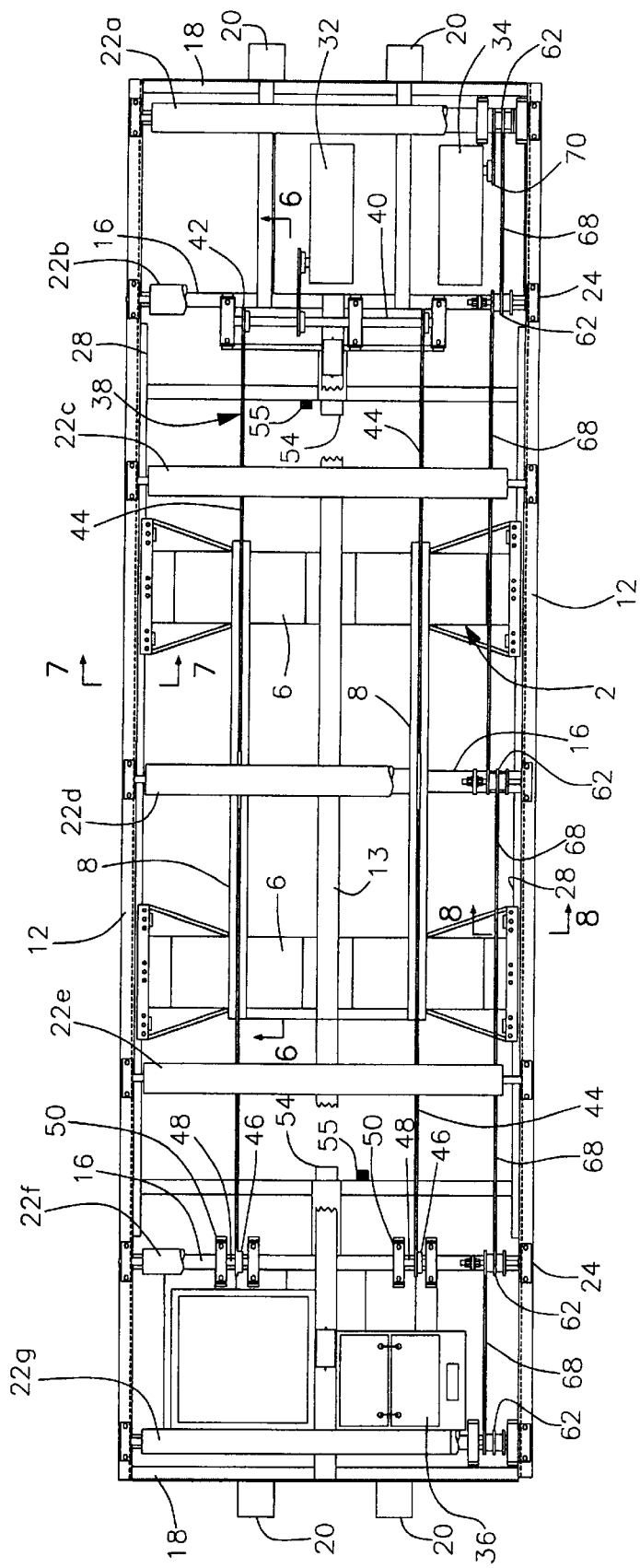
FIG. 4 is a top plan view of the transfer device of the invention with some parts broken to show under lying elements.

The mainframe rollers are actuated by the second reversible motor 34; this motor drives rollers 22a, 22b, 22d, 22f, 22g as shown in FIG. 4, the remaining intermediate rollers 22c and 22e are idle rollers but could be also motorized if useful depending on the shape of the load L. Each motorized roller (see FIG. 8) carries at one end a sprocket 56 driven by a short chain 58 meshing with one sprocket 60 of a triple sprocket 62 carried by a shaft 64 located underneath the associated roller, for instance roller 22d, and secured to beam 12 and to an arm 66 upstanding from transverse bar 16 of mainframe 4.

The remaining sprocket gears of the triple sprocket 62 are in meshing engagement with longitudinally extending sprocket chains 68 connected to the output sprocket 70 of the electric motor 34.

Control switches 72 are mounted at each end of the mainframe 4 to operate the electric motors 32 and 34 as follows (motors 32 and 32 may also be controlled with the use of a remote control, not shown). Motor 32 which shifts the mainframe 4 to either side of underframe 2 is always operated at the same time as motor 34 which drives the mainframe rollers 22a–22g in a direction opposite to the selected shifting movement of the mainframe 4 and at a peripheral speed equal to the speed of the shifting mainframe 4 as to maintain load L always centered with respect to the tine receivers 6 and consequently to the forklift F so has to not cause any sideways tilting of the forklift F and load L.

On the other hand, motor 34 which controls the rotation of the mainframe rollers can be solely operated in one or the other direction to transfer the load L to a rack cell C either to the right or to the left of the forklift F.

Figure 2:
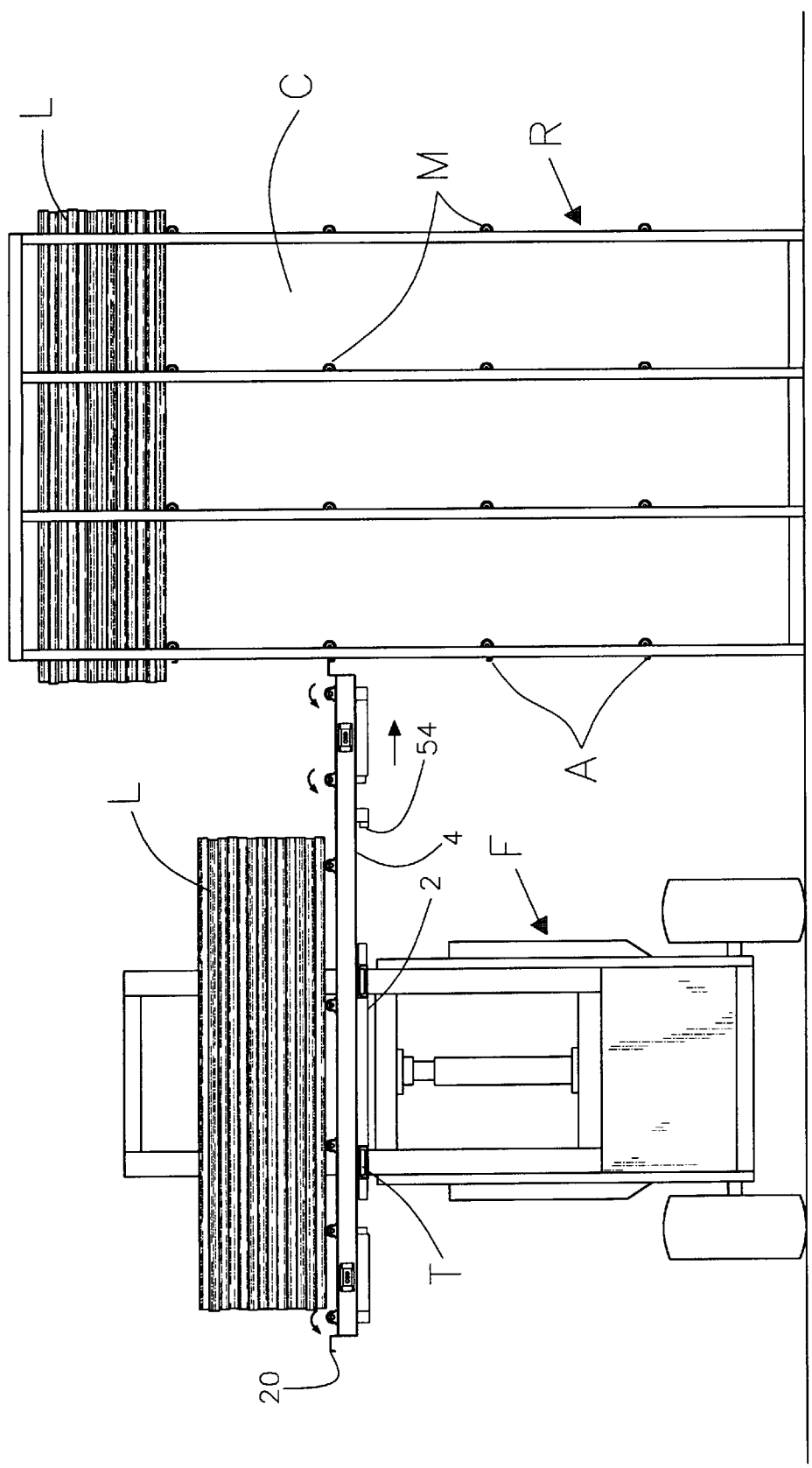
FIGS. 2 and 3 are views similar to that of FIG. 1 showing sequential steps for the load transfer from the forklift to the rack cell.
Figure 3:
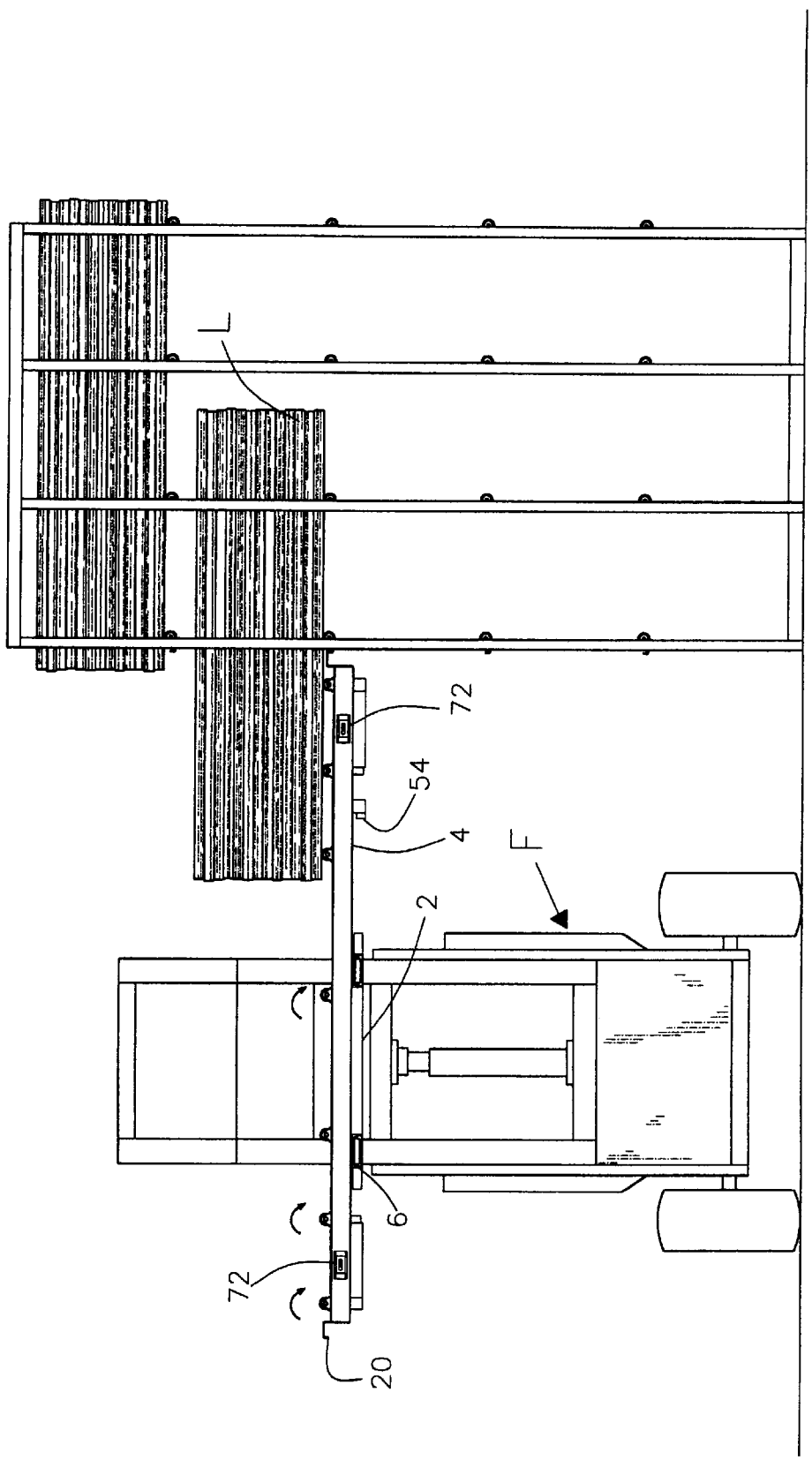

The system is operated as follows. Referring to FIGS. 1, 2 and 3, the forklift brings the load L opposite a selected rack cell C and raises the load L above the anchor bar A so that the hooks 20 will clear this anchor bar; motors 32 and 34 are then actuated by switches 72 (or the remote control) accessible to an operator standing on a suitable platform so as to cause shifting of the mainframe 4 on top of the underframe 2 while the mainframe rollers 22 rotate in the opposite direction to maintain the load L centered with respect to tine receivers 6 and consequently to forklift F. Once hooks 20 have reached a position just above the anchor bar A the load L is lowered by means of the forklift elevating system. Once the hooks are attached to the anchor bar, control switches 72 are used to transfer the load onto the rack cell rollers M by rotating the motorized mainframe rollers 22 in the required direction.

The load L is fully transferred onto the rack cell rollers M since mainframe motorized roller 22*a* is disposed very close to the hooks 20 and consequently to the cell opening of the rack R. Therefore, in stored position the load L hardly protrudes from the face of the rack R.

No sideways tilting moment of the transfer device of the forklift can be produced since the mainframe 4 is fully and solidly hooked onto the anchor bar A of the rack R.

Obviously, the load L can be manually unloaded from the rack R and directly transferred on the hooked mainframe 4 which rolls load L to a centered position; mainframe 4 is then shifted to its centered position with respect to the underframe 2 and consequently to the forklift F.

Any horizontal and vertical forces exerted on the mainframe 4 due to the transfer of the load L to or from the mainframe 4 are clearly firmly resisted by the hooks 20 firmly engaging the anchor bar A of the rack R.

We claim:

1. A transfer device for transferring a load to a cell of a rack which has a transverse anchor bar at its cell opening, said device comprising an underframe including forklift tine receivers, an elongated mainframe overlying said underframe and transverse to said tine receivers, said mainframe having opposite ends, transverse mainframe rollers carried by said mainframe for supporting a load on said mainframe, hooks secured to at least one end of said mainframe to hook said mainframe to said anchor bar, said mainframe overlying and supported by said underframe for guided shifting movement transversely of said tine receivers from a centered position to an off-centered position relative to said tine receivers and a motorized transmission to shift said mainframe from said centered position to said off-centered position while rotating said mainframe rollers in a first direction to maintain said load in a centered position relative to said tine receivers so as to enable hooking of said mainframe to said anchor bar and then to rotate said mainframe rollers in an opposite direction to transfer said load from said mainframe into said rack cell.

2. A transfer device as defined in claim 1, wherein said hooks are secured to both ends of said mainframe, said mainframe, when in centered position equally protrudes from opposite ends of said underframe and is guided for shifting movement by said transmission to a selected one of two opposite off centered positions relative to said tine receivers.

3. A transfer device as defined in claim 2, further including abutments secured to said mainframe and abutting against said underframe to limit the extent of said shifting movement.

4. A transfer device as defined in claim 3, further including mainframe supporting idle rollers carried by said underframe and on which said mainframe is supported and guided and wherein said transmission includes a first reversible motor, a first chain and sprocket gear system carried by said mainframe and driven by said first motor, the chain of said first system being attached to said underframe.

5. A transfer device as defined in claim 4, wherein said transmission further includes a second reversible motor and a second chain and sprocket gear system both carried by said mainframe, said second system driven by said second motor and driving said mainframe rollers.

6. A transfer device as defined in claim 5, wherein said first and second reversible motors when operating simultaneously always cause said mainframe rollers to rotate in a direction opposite to the direction of rotation of said idle rollers and at peripheral speed equal to the speed of the shifting movement of said mainframe.

7. A transfer device as defined in claim 6, wherein said first and second reversible motors are electric motors and further including batteries carried by said mainframe and electrically connected to said first and second motors.

8. A transfer device as defined in claim 7, wherein said tine receivers are sleeve members forming part of said underframe.

9. A transfer device as defined in claim 4, further including proximity switches secured to said mainframe and electrically connected to said first motor, said proximity switches being provided to stop said shifting movement of said mainframe on either side of said underframe just prior to said abutments coming into actual contact with said underframe.

10. A transfer device as defined in claim 9, wherein said transmission further includes a second reversible motor and a second chain and sprocket gear system both carried by said mainframe, said second system driven by said second motor and driving said mainframe rollers.

11. A transfer device as defined in claim 10, wherein said first and second reversible motors when operating simultaneously always cause said mainframe rollers to rotate in a direction opposite to the direction of rotation of said idle rollers and at peripheral speed equal to the speed of the shifting movement of said mainframe.

12. A transfer device as defined in claim 11, wherein said first and second reversible motors are electric motors and further including batteries carried by said mainframe and electrically connected to said first and second motors.

13. A transfer device as defined in claim 12, wherein said tine receivers are sleeve members forming part of said underframe.

* * * * *